United States Patent
Mitchell et al.

(10) Patent No.: US 6,349,301 B1
(45) Date of Patent: Feb. 19, 2002

(54) VIRTUAL ENVIRONMENT BYSTANDER UPDATING IN CLIENT SERVER ARCHITECTURE

(75) Inventors: Donald P. Mitchell; Steven M. Drucker, both of Bellevue; Kirk J. Marple, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/028,424

(22) Filed: Feb. 24, 1998

(51) Int. Cl.$^7$ .............................. G06F 17/00; G06F 7/00
(52) U.S. Cl. ...................................................... 707/101
(58) Field of Search .......................... 707/10, 103, 104, 707/202

(56) References Cited

U.S. PATENT DOCUMENTS

| | | | | |
|---|---|---|---|---|
| 5,347,306 A | * | 9/1994 | Nitta ............................ | 348/15 |
| 5,491,820 A | * | 2/1996 | Belove et al. ............... | 395/600 |
| 5,823,879 A | * | 10/1998 | Goldberg et al. ............. | 463/42 |
| 5,920,725 A | * | 7/1999 | Ma et al. ...................... | 395/712 |
| 5,926,179 A | * | 7/1999 | Matsuda et al. ............. | 345/355 |
| 5,930,474 A | * | 7/1999 | Dunworth et al. ..... | 395/200.47 |
| 5,956,485 A | * | 9/1999 | Perlman ................ | 395/200.34 |
| 5,999,944 A | * | 12/1999 | Lipkin ......................... | 707/104 |
| 6,012,984 A | * | 1/2000 | Roseman ..................... | 643/42 |
| 6,058,397 A | * | 5/2000 | Barrus et al. ............... | 707/104 |
| 6,088,698 A | * | 7/2000 | Lipkin ......................... | 707/10 |
| 5,950,202 A | * | 11/2000 | Kamachi et al. ............. | 345/355 |
| 6,151,027 A | * | 11/2000 | Yoo ............................. | 345/423 |
| 6,154,211 A | * | 11/2000 | Kamachi et al. ............. | 345/355 |
| 6,175,842 B1 | * | 1/2001 | Kirk et al. ................... | 707/513 |
| 6,229,546 B1 | * | 5/2001 | Lancaster et al. ........... | 345/419 |

* cited by examiner

*Primary Examiner*—John Breene
*Assistant Examiner*—Linh M Pham
(74) *Attorney, Agent, or Firm*—Ronald M. Anderson

(57) ABSTRACT

A virtual world environment (VWE) employing a client-server architecture to organize data defining the VWE and objects contained therein in a system of distributed databases. An object in the VWE is one of four basic types including: an artifact, an avatar, a portal, and a room. A world database is maintained by a server computer and is the central storehouse for data defining the entire VWE. Each user has a client computer that is coupled in communication with the server computer. The client computer administers a local database defining at least a portion of the VWE. Each object that is affected by a change in another object is said to be in a bystander region of the other object. The local database maintained by the user's client computer is only updated by the server computer to include changes to the objects associated with the client computer (user) in the bystander region of the other object, i.e., changes evident to an object associated with the user. As a result, many more users can be supported by the server computer and data transmission over the network link between the server and client computers is minimized.

39 Claims, 8 Drawing Sheets

VIRTUAL ENVIRONMENT BYSTANDER UPDATING IN CLIENT SERVER ARCHITECTURE

FIELD OF THE INVENTION

The present invention generally relates to a method and system for rendering a virtual world environment (VWE), and more specifically, to a method and system that employs a client-server architecture for updating clients with changes in the VWE.

BACKGROUND OF THE INVENTION

A VWE represents a real or imaginary place using graphics, images, video, force feedback, and audio data to define the representation on a computer to one or more users. Typically, the VWE is presented to each user on a conventional display, such as a monitor, or using special display devices that are worn like eyeglasses to enhance the illusion that the user is immersed in the VWE. An integrated combination of interacting software and hardware is used to produce a VWE that is an extension of the physical world to each user and to guide and manage interactions between the user(s) and the VWE.

There are several properties that are commonly included in a VWE. One property is enabling multiple users to simultaneously perceive and interact with the VWE and with each other through different computers that are connected by a network. Because multiple users often participate in a VWE, providing means for communicating with other users by text and/or audio messaging is a highly desirable characteristic for a VWE. Another desirable feature is enabling the user to interact with one or more simulations produced by the computer. These simulations may go beyond merely imitating the physical world and may enable activities that could not exist outside the VWE, but which are only possible in the imagination of the user. For example, a user participating in a VWE may choose to engage a fire-breathing dragon in a duel or fly on a magic carpet. To maintain a sense of reality, a VWE should dynamically perform an immediate update for each affected user when a change in the VWE occurs, e.g., when a user enters/leaves a portion of the VWE or interacts with a computer simulation in some manner.

A precursor to the VWE was the multi-user dungeon (MUD). Some MUDs were employed to produce fantasy games and others were used to socialize an online community of users. In a MUD, the surroundings, two or more players, and actions were represented in text-based displays for each user. The MUD was also used to organize the properties and characters for a plurality of users in a role playing game. For example, in a game managed by a MUD, each user would have a permanent identity that could be associated with a plurality of characters, each character could carry and wield selected artifacts, and each character could also move between different locations. Further, the MUD usually employed a database to store the gaming history of each user and the particular properties associated with each character. Typically, the MUD would control the production and distribution of the text to each user for display on that user's computer. However, MUDs have not been successfully employed to solve the larger problem of producing and distributing a graphically based VWE for a large number of users, because of their inherent limitations.

In the past, a MUD was often implemented by a main computer in a system that employed a main-remote architecture. The tasks typically associated with the main computer were storing data, maintaining a database, producing text, and controlling the distribution of the text to each remote computer for display to the user. Further, the main computer would process and immediately distribute a message to each remote computer whenever a change in the game had occurred. Unfortunately, the amount of information that must be processed by the main computer and transmitted to each remote computer (user) increases exponentially as the number of users increases arithmetically, i.e., for n users, the total amount of data that the main computer must determine and transmit to each remote computer is roughly $n^2$. Consequently, the use of a main-remote computer system to produce and display a MUD tends to create a computational and data transmission resource crisis with even a relatively small number of users disposed in the same location.

Although VWEs may be displayed in two dimensions (2D), three-dimensional (3D) VWEs have become increasingly popular. Some of the most popular VWEs use rendered geometric models and audio data to provide both a visual and auditory 3D perspective for the user. In this way, one user may hear the sound (voice) of another approaching user before actually "seeing" the other user in the VWE, e.g., a virtual door in a wall that separates two users may still enable the users to "hear" each other while the wall in which the door is disposed blocks their visual perception of each other. Updating the visual and/or auditory perspectives according to a user's movement, spatial disposition, and perceptive occlusion—in an acceptable time frame—has proven to be a difficult problem to solve in the prior art.

A popular type of VWE is the multiple user game that employs a graphically based 3D environment to provide interactions between computer simulations and/or users. Typically, VWEs do not employ the main-remote computer systems used by MUDs. Instead, a client-server architecture may be employed to manage the VWE, and distribute tasks between the server and client computers. In this prior art approach, a server computer controls and processes a complete or "world" database for everything disposed in the VWE. The server then determines and downloads a complete geometric model for the entire VWE to each client computer, which stores the model in a temporary cache. Further, the client computer performs the processing associated with rendering the images in accordance with the downloaded geometric model and displays the rendered images as a 3D VWE to the user. However, since the clients are not enabled to change the geometric model when local interactions occur, the server must re-determine the entire model for changes that occur in response to user actions. Following such a change, the geometric model is again downloaded by the server as an update to each client. The clients help reduce the computational demands on the server by performing the intensive tasks associated with rendering the images that are displayed to the user. Also, since the amount of data that must be transmitted from the server to each client is reduced when the client provides the image rendering resources, the overall efficiency of a network employed by the VWE is somewhat improved.

Although the client-server system discussed above may reduce the total amount of data that must be transmitted to each user's computer and conserves server resources, the reduction in required data transmission is insufficient to enable large numbers of users to simultaneously participate in a VWE. Additionally, if sound or force feedback is employed to provide the user with an even more sensory VWE perspective, the amount of transmitted data required to maintain the VWE in a realistic manner is far too great for this client-server model to support.

Accordingly, it will be apparent that a new approach is needed that will significantly reduce and/or more efficiently distribute the demand for computational resources for producing and maintaining a VWE between the computational devices in a network on which a VWE is accessed. A client-server architecture should be employed in a different manner than in the prior art to solve the problem of providing a VWE to an extremely large number of users. Moreover, each client should be able to dynamically perform updates to that portion of the VWE perceived by the client when local interactions occur in the VWE. This approach should enable a VWE to be produced and to respond to changes that occur.

SUMMARY OF THE INVENTION

In accord with the present invention, a method is defined for updating a VWE that is displayed to a plurality of users, to include a change in the VWE. The method includes the step of associating objects with the user. An object is chosen by the user for display on a client computer that manages a local database defining at least a portion of the VWE. The local database contains an entry for each object that is disposed within a bystander region of the displayed object. In response to a change in a selected object caused by one of the plurality of users, the change is transmitted to a server computer that maintains a world database containing at least one entry for every object disposed within the VWE. The world database is updated by the server computer to include the change in the property of the selected object. Affected objects disposed in the bystander region of the selected object are determined. The change in the property of the selected object is then entered in the local database maintained by the client computer of each user associated with an affected object. This change is conveyed by the server computer to each such client computer. Further, the change in the property of the selected object is displayed by the client computer of each affected object that senses the change and is being displayed. Thus, the change is provided for the users who are associated with affected objects.

The method also preferably includes the step of displaying each object contained within the local database maintained on the client computer to the user. The step of displaying each object includes the step of representing the portion of the VWE maintained within the local database with at least one of graphics, video, text, and sound.

Each entry in the local database and in the world database specifies a plurality of properties and a type for the associated object disposed within the VWE. The base types for an object disposed within the VWE comprise either an avatar, an artifact, a portal, or a room. Furthermore, the plurality of properties for each object disposed within the VWE comprises at least one of a name, a geometry, an owner, a location, and a contents list. Each object disposed within the VWE that comprises a container preferably includes a content property and is identified as either an open container or a closed container. An object included in the contents list of a container is not sensed by objects disposed within the bystander region of the container unless the container is identified as an open container.

The client computer is typically located remote from the server computer, so that the server computer transmits information to and receives information from the client computer over a communication link. Thus, the communication link can include either an Internet or an intranet network.

It is also contemplated that the server computer can comprise a plurality of server computers linked together in communication. In this embodiment, the number of server computers comprising the plurality can be varied dynamically as required to administer the world database.

Another aspect of the present invention is directed to a system for displaying a VWE for a plurality of users, each user having a client computer and being represented by an object in the VWE. The system includes a server/client network that has a server computer and the client computer of each user. A memory is provided for storing both machine instructions and a world database that defines the VWE. A server communication device links the server computer in communication with a plurality of client computers, each of which has a client communication device. A processor is coupled to the server communication device and the memory. The processor executes the machine instructions stored in the memory and exchanges information with each client communication device. The machine instructions cause the processor to implement functions that are generally consistent with the steps of the method discussed above.

Yet another aspect of the present invention is directed to a computer readable medium that provides machine instructions to a server computer and a client computer causing them to perform functions that are generally consistent with the method steps discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Definition of Terms

Figure 1:
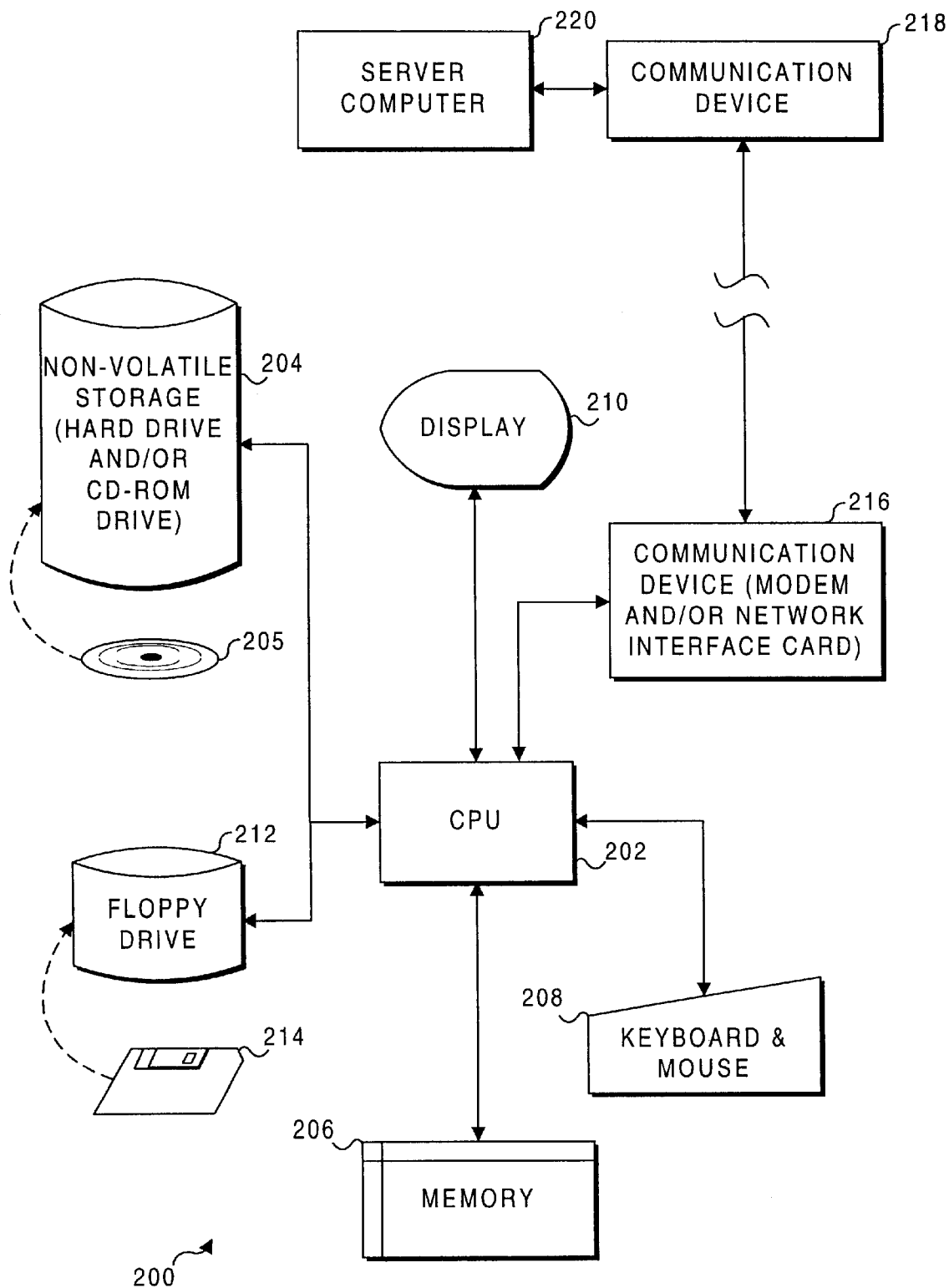
FIG. 1 is a block diagram illustrating an exemplary digital computer system suitable for executing the present invention, either as a server computer or as a client computer.

In a preferred embodiment of the present invention, a VWE is a graphically rendered environment that may comprise a plurality of objects. The definitions of the terms presented below are provided to clarify their use in the specification and in the claims that follow.

Object: An abstraction consisting of data and the operations associated with that data. There are four basic object types provided in the present invention: room, avatar, artifact, and portal. Each type of object may be further specialized to perform particular operations. Also, each object has at least the properties of: name, owner, location, and content list. Further, those objects that are represented graphically also include the property of geometry.

Room: An object that defines a discrete region of the VWE where all potential perception between other objects disposed in that region is contained.

Artifact: A type of object that is specialized for particular operations, such as a container, tool, document, and weapon. The artifact may be observed, carried, controlled, and wielded by another object and/or a computer simulation. An artifact may contain other types of specialized artifacts and objects e.g., a box artifact (container) might contain a book, a sword, an avatar, and a bag (another container).

Avatar: An object disposed within a room or other portion of the VWE, which may be controlled by a user and/or a computer simulation. The avatar may e represented by different types of data, including graphic, image, video, force feedback, and audio. An avatar's behavior, such as its motions, gestures, and speech, may be controlled by an associated user's voice, keyboard, or other input device. The user's control of the behavior of the avatar is analogous to a puppet that is manipulated by a puppeteer.

Portal: A "doorway" that links rooms together and enables the movement of objects between the linked rooms. Movement by an object between two rooms occurs when an object enters a portal from one room and exits the portal into another room.

Bystander region: A region that is associated with an object, and which is disposed generally at the location of the object in the VWE. The extent for the bystander region is based on the extent of another object, e.g., a room, that contains the object associated with the bystander region. Each object contained within the extent of the bystander region can be potentially sensed by any other object inside the region.

Perception region: A region that is associated with an object, and which is disposed generally at the location of the object in the VWE. The object may be enabled to sense a plurality of types of data, e.g., graphic, image, video, text, audio, and force feedback, and each type of data may be associated with a separate extent of the region. The extent of each perception region defines that portion of the VWE in which the object within the region can immediately sense the type of data associated with the modality of the region. Distance and/or the properties of another object(s) may affect the extent of the perception region for a specific data type. Also, a perception region may be associated with a plurality of objects and have an extent that includes multiple objects disposed in a plurality of locations.

Exemplary Operating Environment

The present invention is intended to be incorporated in any application that renders a VWE, such as a game or a network chat room. These programs and the functions implemented in the present invention are executed on digital computers, such as an exemplary digital computer 200, which is illustrated by a simple block diagram in FIG. 1. Digital computer 200 may comprise any personal desktop computer, laptop/notebook computer, work station, or other digital computer that includes a central processing unit (CPU) 202, a memory 206, a keyboard and optionally a mouse (or other pointing device) 208, a display 210, an optional floppy drive 212, and a nonvolatile storage 204 for programs and data, such as a hard drive and preferably a compact disk-read only memory (CD-ROM) 205. Further, computer 200 incorporates a communication device 216, such as a modem, integrated services digital network (ISDN) adapter, or a network interface card (NIC) for high-speed data transmission used to exchange data with another communication device 218 that is coupled to a server computer 220. The server computer includes similar components to those in digital computer 200. Additional details of the computers are not required to fully disclose the present invention, since such devices are generally well known to those of ordinary skill in the art.

Typically, a client application that incorporates the present invention would be loaded in nonvolatile storage 204, i.e., onto the hard drive of computer 200, from a removable floppy disk 214 that is inserted into floppy drive 212, or from removable CD-ROM 205. When the program comprising these machine instructions is to be executed, the machine instructions are loaded into memory 206, which includes both read only memory (ROM) and random access memory (RAM) (not separately shown). The machine instructions, once loaded into RAM, can be executed by CPU 202. The user provides input and controls the application being executed using the keyboard and/or mouse or other pointing device. Although the exemplary operating environment described herein employs a hard disk, floppy disk 214, and CD-ROM 205, it should be appreciated by those skilled in the art that other types of computer readable media, which can store data that are accessible by a computer, such as magnetic cassettes, flash memory cards, digital video disks, Bernoulli cartridges, RAMs, ROMs, and the like, may also be used for conveying machine instructions that define the present invention and which are used to define an operating environment for it.

Server computer 220 is used to download a VWE to a large number of individual client computers so that objects selected by the user or rendered by an application are presented on display 210. The user views and manipulates the objects, e.g., by adding, deleting, or moving the objects within the VWE. Also, all updates to the VWE are handled automatically and dynamically by the server computer, so that the users have considerable latitude in moving an avatar or other object within the VWE.

The present invention limits the data maintained by each client computer to a portion of that required to define the entire VWE on the basis that the remainder of the VWE that is outside the potentially immediate perception of a user is not of any consequence to the user. Further, when a change could be sensed by objects disposed in the VWE, an update is only provided to the local databases of the users (clients) associated with objects that may potentially sense the change. For example, an object that is moved by and associated with a user, from an old location (such as a room) through a portal to a new location (such as a connected room) will cause the server computer to update the client computer (local database) of the user with all of the information necessary to portray all of the other objects in the new location. Further, all client computers of users associated with other objects in the old and new locations will receive a selectively determined update that depicts the potential presence or absence of the moved object. It is important to note that a client computer containing an entry for an object in its local database following such an update, may sense and display the object without further communication from the server computer.

The present invention incorporates some of the more desirable characteristics of a MUD and a client-server architecture, so that an extremely extensible VWE can be presented to the user. The server computer administers a world database that contains the properties for each object associated with all of the users. Further, when a change occurs in the VWE, the server computer updates the VWE representation on the client computers only for the users that are affected by the change in their "bystander region," i.e., only for a change that an object such as an avatar that is associated with a user can potentially sense. Also, the ability of a particular object to sense a specific type of change in the VWE is determined by the properties of the object that are contained in the local database. Accordingly, the present invention solves the problem of reducing server computational and data transmission resource demands, by only providing updates of a changed object to clients associated with objects that include the changed object within their bystander regions. Moreover, unlike many of the prior art systems, the object based VWE of the present invention is almost infinitely expandable, so that it can accommodate an extremely large number of users, spread throughout a number of different regions or rooms in the VWE.

Figure 2:
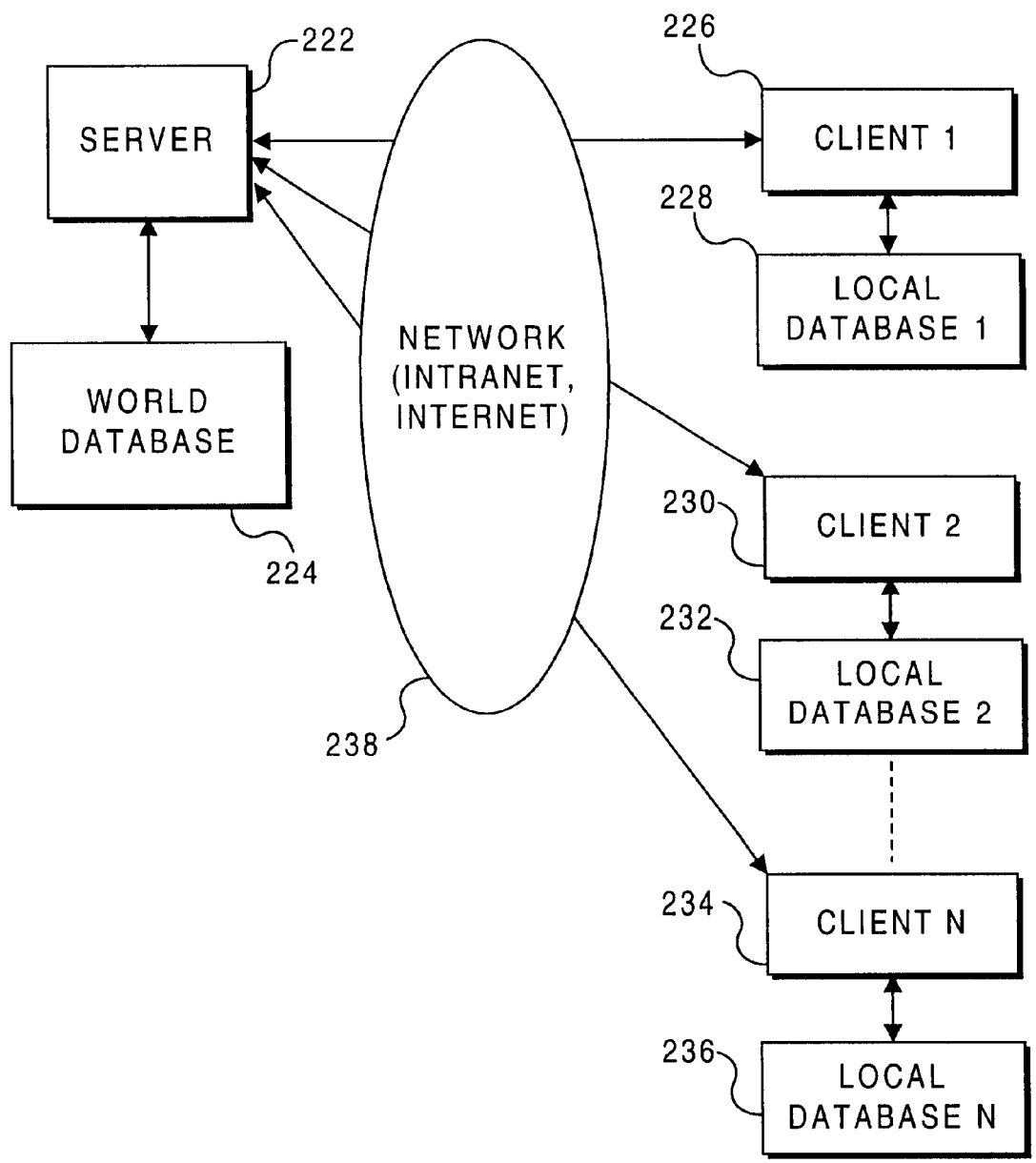
FIG. 2 is an exemplary view of the client-server architecture showing the world database maintained by the server computer, and local databases maintained by each of n client computers.

Referring now to FIG. 2, an exemplary block diagram of the client-server architecture for a VWE and local databases is illustrated. In the following description, the term "server" is used interchangeably with the term "server computer" and the term "client" is used interchangeably with the term "client computer." A server 222 continuously maintains a world database 224 that contains the most up-to-date version of the entire VWE, and which includes all objects disposed therein. A first client 226 maintains a first local database 228, which includes a subset of the information contained in world database 224. Further, first local database 228 need only contain those objects that may potentially affect objects associated with first client 226. A second client 230 maintains a second local database 232 that contains information about objects that may potentially affect objects associated with the second client, and thus may be different in its information content than the first local database. Moreover, server 222 is shown coupled to an $n_{th}$ client 234 having an n local database 236, to indicate that an indeterminate number of other clients can be coupled to the server for interaction in the VWE.

Additionally, the server and the clients can be positioned remotely from each other at disparate locations, so that they must communicate over a network 238 such as the Internet, an intranet, or other communication link, to exchange data. Further, the server can actually comprise a network of distributed servers to scale resource capacity as necessary to efficiently administer the world database. The use of distributed servers to administer the world database would thereby provide dynamic scaling of resources to match the number of users participating in the VWE. Also, an extremely important feature of the claimed invention is that the server can anticipate the need for an update to a particular local database, so that synchronous "handshakes," which would require frequent bi-directional exchanges between the clients and the server, are dramatically reduced, and computational and data transmission resources of the server and client, and of the network may be more efficiently employed.

Figure 3:
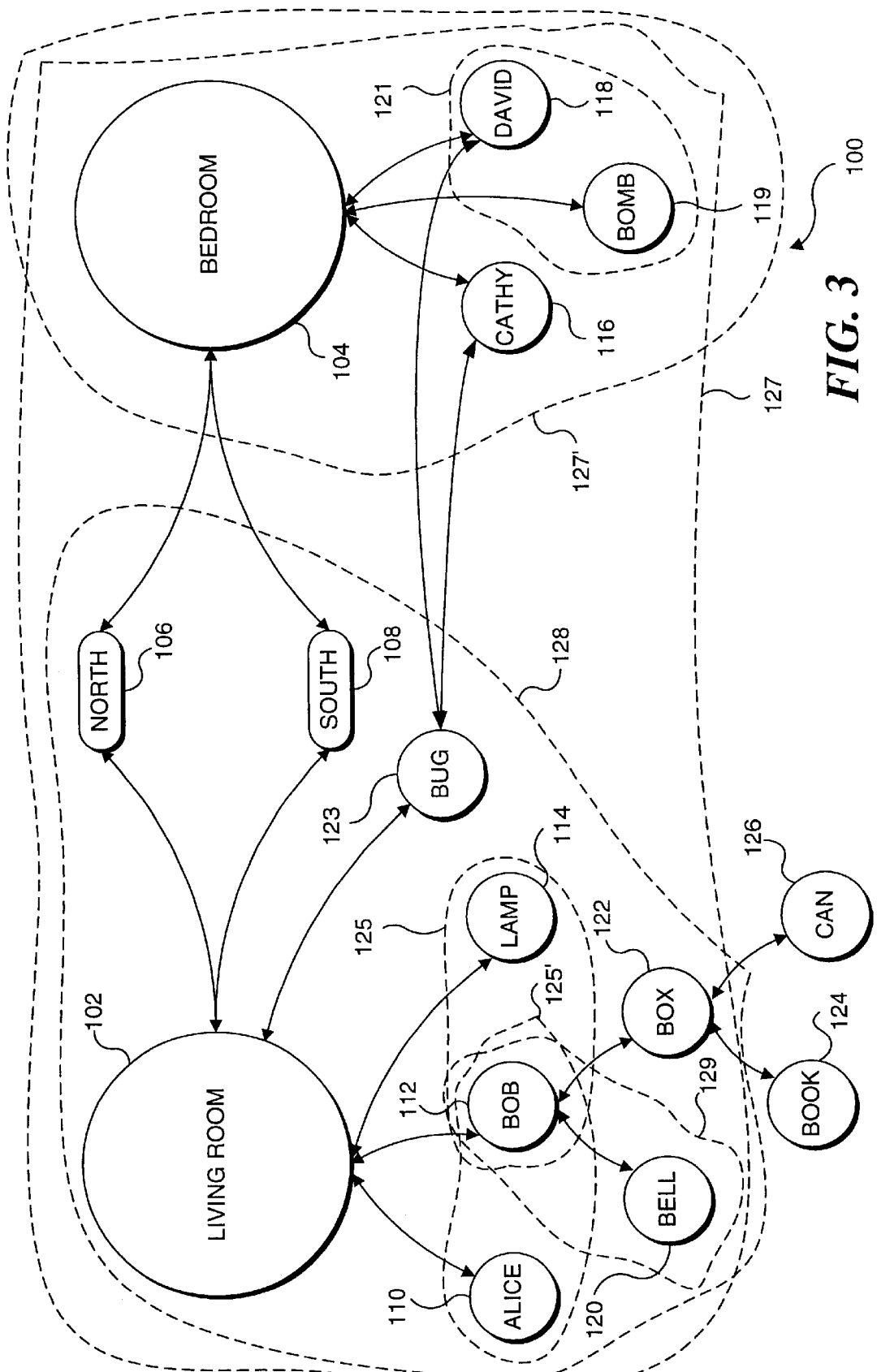
FIG. 3 is an exemplary view of a VWE illustrating one example of the divisions within the virtual world by rooms, perception regions, and bystander regions.

In FIG. 3, an exemplary VWE 100 is shown in a block diagram. A living room 102 and a bedroom 104 are linked together by a north portal 106 and a south portal 108. These portals are associated with living room 102 and bedroom 104, so that an object entering a portal in a room will automatically be moved into the other room on the other side of the portal. Further, north portal 106 and south portal 108 are simultaneously contained in living room 102 and bedroom 104. Bedroom 104 contains a Cathy avatar 116, a bomb artifact 119, and a David avatar 118. Also, living room 102 is filled with other objects that include a lamp artifact 114, a bug artifact 123 (i.e., a microphone listening device), an Alice avatar 110, and a Bob avatar 112. Additionally, Bob avatar 112 is associated with a pair of artifacts, including a bell 120 and a box 122, which has the property of a closed container. Further, box 122 is associated with another pair of artifacts, specifically, a book 124 and a can 126. Moreover, a bystander region 128 is shown enveloping living room 102, Alice avatar 110, lamp 114, Bob avatar 112, north portal 106, south portal 108, bell 120, bug artifact 123, and box 122. Since box 122 is "closed" so that book 124 and can 126 contained within the box are not presently perceivable by Bob avatar 112, the box contains objects that may not affect Bob avatar 112. It is important to note that a change in an object that occurs within bystander region 128 may only be potentially "sensed" by client objects disposed therein, and the change can not be sensed by objects disposed outside the bystander region, such as book 124 and can 126. Thus, a local database update, which is explained in greater detail below, is only provided to each of those client computers of users associated with objects, such as avatars, that may potentially "sense" the change and are disposed within the bystander region of the changed object.

The ability of an object to sense the changes in other objects that produce various types of data may depend upon the disposition of the sensing object in the VWE. For example, light produced by a lamp artifact may be sensed at a greater distance by an avatar disposed in a virtual open field than a sound produced by a bell artifact. Conversely, the sound may be more readily sensed by the avatar when it is positioned within a virtual structure that obstructs the light. Thus, separate boundaries for the perception region of the avatar may exist for various types of data produced by an object.

An exemplary auditory perception region extent 129 depicted in FIG. 3 contains an object (bell 120) that will be "heard" by Bob avatar 112 when the bell rings. A visual perception region extent 125 contains lamp 114, which is "seen" by Bob avatar 112 when Bob is oriented or facing towards the lamp. However, if the disposition of Bob avatar 112 changes so that Bob is oriented towards Alice avatar 110 and thus facing away from lamp 114, the perception region boundaries for Bob may change. In this case, Bob avatar 112 may continue to sense the ringing of bell 120 (because auditory perception region extent 129 has not changed), but Bob may no longer be able to visually sense lamp 114. A new visual perception region extent 125' then applies. Although not shown, it is understood that another change in the location of Bob avatar 112 may enable Bob to visually perceive Alice avatar 110 and lamp 114, but be unable to sense the ringing of bell 120. Bell 120 would then be disposed outside the of the auditory perception region extent for Bob avatar 112 at the new location.

Also, it is further envisioned that yet another perception region extent would be provided for sensing force feedback effects (haptic feedback data) relative to objects disposed within the bystander region of objects. For example, an extent for force feedback perception region 121 is shown for David avatar 118 that includes bomb 119. Since the bomb is within the force feedback perception region of David avatar 118, the client (user) associated with the David avatar would be able to sense when bomb 119 explodes, e.g., if the user were manipulating a joystick to cause David avatar 118 to walk toward the exploding bomb, the force of the explosion would be experienced as a backward thrust on the joystick handle. Force feedback output devices can provide a plurality of different types of tactile sensations (effects) that would simulate the percussive effects of an explosion. Also, a gradient for a force feedback perception region 121 may be provided to vary the intensity of the force feedback effects in relation to the distance between bomb 119 and other objects disposed in bedroom 104. Similarly, gradients may be provided for the visual and auditory perception regions associated with an object. It is important to note that bomb 119 is not within the force feedback perception region of Cathy avatar 116 and accordingly, the user associated with the Cathy avatar will not sense the force feedback effects associated with bomb 119. However, if the location of Cathy avatar 116 within bedroom 104 changes, the user associated with the Cathy avatar may be enabled to sense the effects of the explosion if the location of the bomb is within the force feedback perception region extent of the Cathy avatar at the new location of the avatar.

Further, the present invention enables a perception region associated with an object to have an extent that includes multiple objects disposed in multiple rooms. For example, FIG. 3 illustrates an auditory perception region 127 that is associated with Cathy avatar 116. The extent of auditory perception region 127 includes substantially all of the objects disposed within both living room 102 and bedroom 104, except for book 124 and can 126, which are positioned inside closed box 122. Further, Cathy avatar 116 is in communication with bug artifact 123, which enables Cathy avatar 116 to sense auditory data produced within living room 102 from a location inside bedroom 104. However, if Cathy avatar 116 were not in communication with bug artifact 123, another auditory perception region 127' would be associated with Cathy avatar 116. The extent of auditory perception region 127' only includes objects disposed within bedroom 104. Similarly, David avatar 118 is in communication with bug artifact 123, which enables David avatar 118 to sense sounds produced inside living room 102 from a position within bedroom 104. Also, auditory perception region 127 is associated with David avatar 118 when bug artifact 123 is in communication with David avatar 118. Further, other auditory perception region 127' would be associated with David avatar 118 when bug artifact 123 is not in communication with David avatar 118.

Although bug artifact 123 is shown increasing the extent of a static (non-moving) auditory perception region associated with an avatar, it is also envisioned that a dynamic (moving) perception region could be provided for various data types. For example, a mobile object that could sense at least one type of data could be commanded to travel to various locations within the VWE and communicate data sensed at the locations to an avatar. Thus, the immediate disposition of the mobile object could dynamically change the perception region extent associated with the avatar for the type of sensed data provided by the mobile object.

Figure 4:
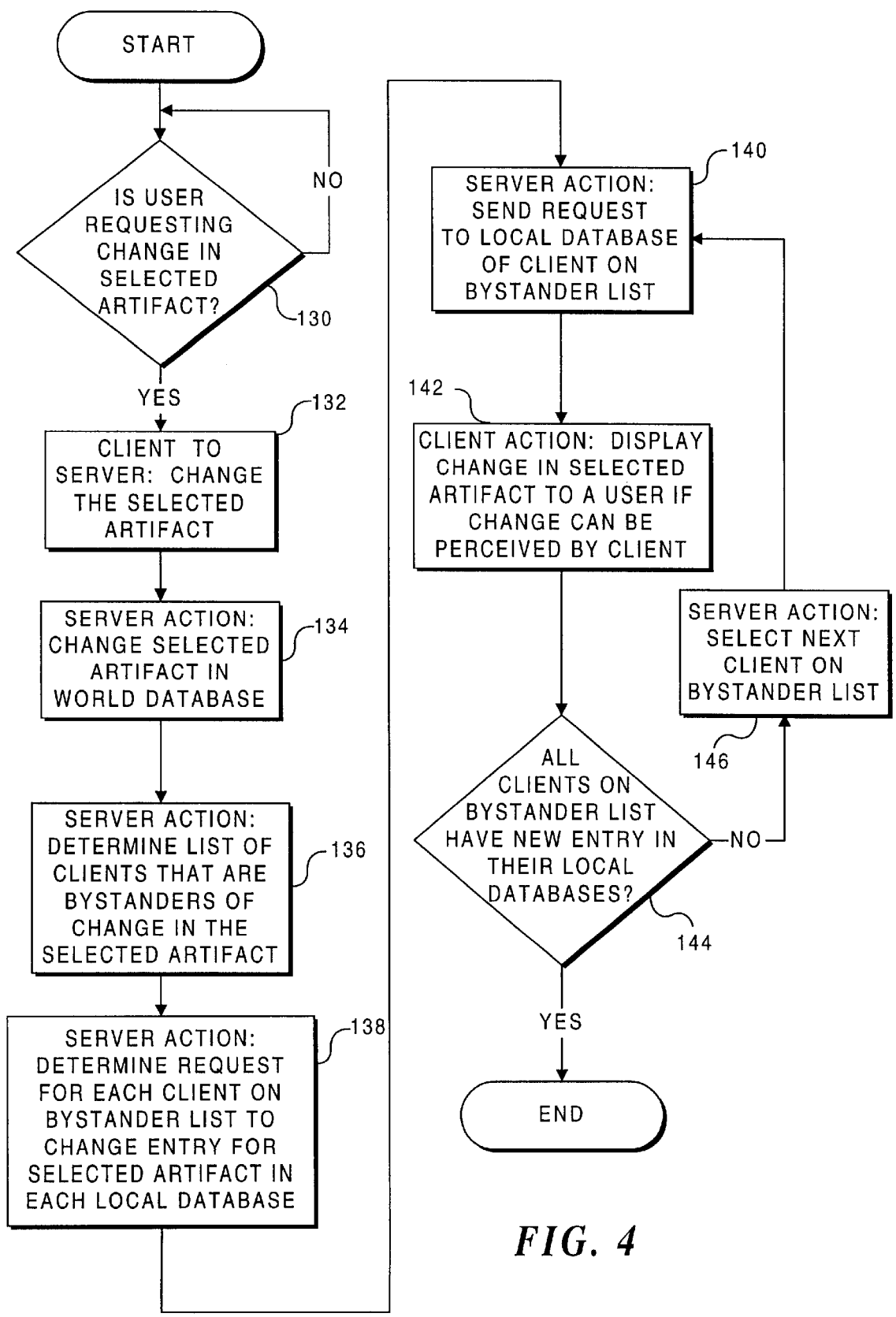
FIG. 4 is a flow chart providing an overview of the logic for updating a client's local database when a change occurs.

Turning now to FIG. 4, a flow chart illustrates the steps required to update a property of a selected artifact that has changed. Beginning with a start block, the logic flow advances to a decision block 130 and awaits a command by a user to change a property of a selected artifact. Once such a command is detected, the logic shifts to a block 132 in which the client requests that the server change a property of the selected artifact. The logic then advances to a block 134, which provides that the server change the property of the selected artifact in the world database. The world database contains all of the information required to represent all of the objects in the VWE. After updating the world database, the logic flows to a block 136 in which the server determines a list of client computers of users that are bystanders of the change in the property of the selected artifact. In this example, the location property has not changed and the bystander clients are associated with objects that are avatars, which may at least be potentially affected by the change.

Once the list of bystanders is determined, the logic moves to a block 138; this block indicates that the server makes requests to change at least one entry in each client's local database. The requests specify the change in the property of the selected artifact for each client on the list of bystanders.

After the requests are made, the logic advances to a block 140, and the server sends the request to change the local database entry to a client on the list of bystanders. The logic flow now moves to the client in a block 142. If the change in the property of the selected artifact is within the perception region of the avatar associated with the client that has received the request, the change will be displayed and/or produced by the client for its user. The flow of logic continues with a decision block 144 that determines whether each of the clients on the list of bystanders has received a request to change the entry in their respective local databases. If so, the logic advances to an end block, and the updating of local databases is complete. However, if any bystanders (i.e., clients on the list of bystanders) remain that have not received a request, the logic moves to a block 146 and the server selects the next client on the list of bystanders. Once the next client is selected, the logic loops back through blocks 140, 142, and 144; the looping continues until all clients on the list of bystanders have received their requests. After the last client on the list of bystanders has received a request, the logic advances from block 144 to the end block.

Figure 5:
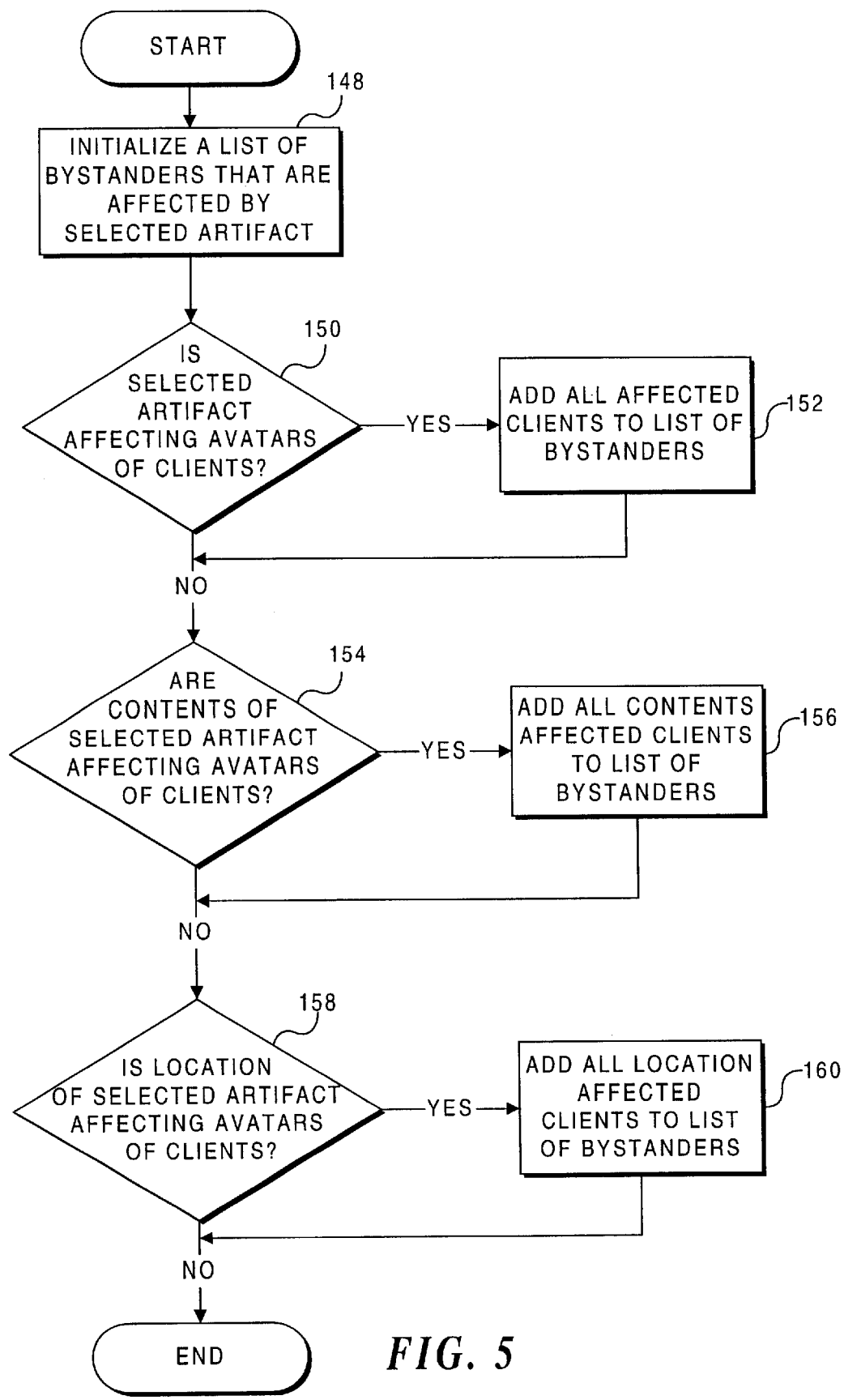
FIG. 5 is a flow chart showing the steps for determining the clients that are bystanders of a changed object.

The details of determining the client on the list of bystanders in block 136 of FIG. 4 are illustrated by the flow chart shown in FIG. 5. Moving from a start block to a block 148, the logic initializes a list for containing clients associated with avatars that are potentially or actually affected by a change to a property of the selected artifact. After initialization, the logic advances to a decision block 150, and a determination is made as to whether the change to the artifact affects the avatars of any clients, i.e., whether the change occurs within the perception region extent of the avatar associated with the client. For example, a selected artifact that is wielded as a weapon by an avatar against another avatar would be considered to actually affect the other avatar. If the determination in decision block 150 is positive, the logic steps to a block 152, and all clients actually affected by the change in the property of the artifact are added to the list of bystanders.

If the determination in block 150 is negative, or if block 152 is completed, the logic moves to a decision block 154, and a determination is made as to whether the contents of the artifact potentially or actually affect any client avatars. Interestingly, the contents of the selected artifact will not immediately affect any avatars unless the selected artifact represents a container that has the property of an open container, so that its contents are exposed. If the test in decision block 154 is true, the logic flows to a block 156, and all clients that are potentially or actually affected by the contents of the artifact are added to the list of bystanders. If the result in decision block 154 is false or if block 156 is already completed, the logic steps to a decision block 158. In block 158, the logic determines if the location of the artifact potentially affects the avatars of any clients. If so, the logic proceeds to a block 160, and all clients that are potentially affected by the location of the selected artifact are added to the list of bystanders. However, if not, or if block 160 is already completed, then the logic advances to an end block, and the list of bystanders for changes in a selected artifact is complete.

Figure 6:
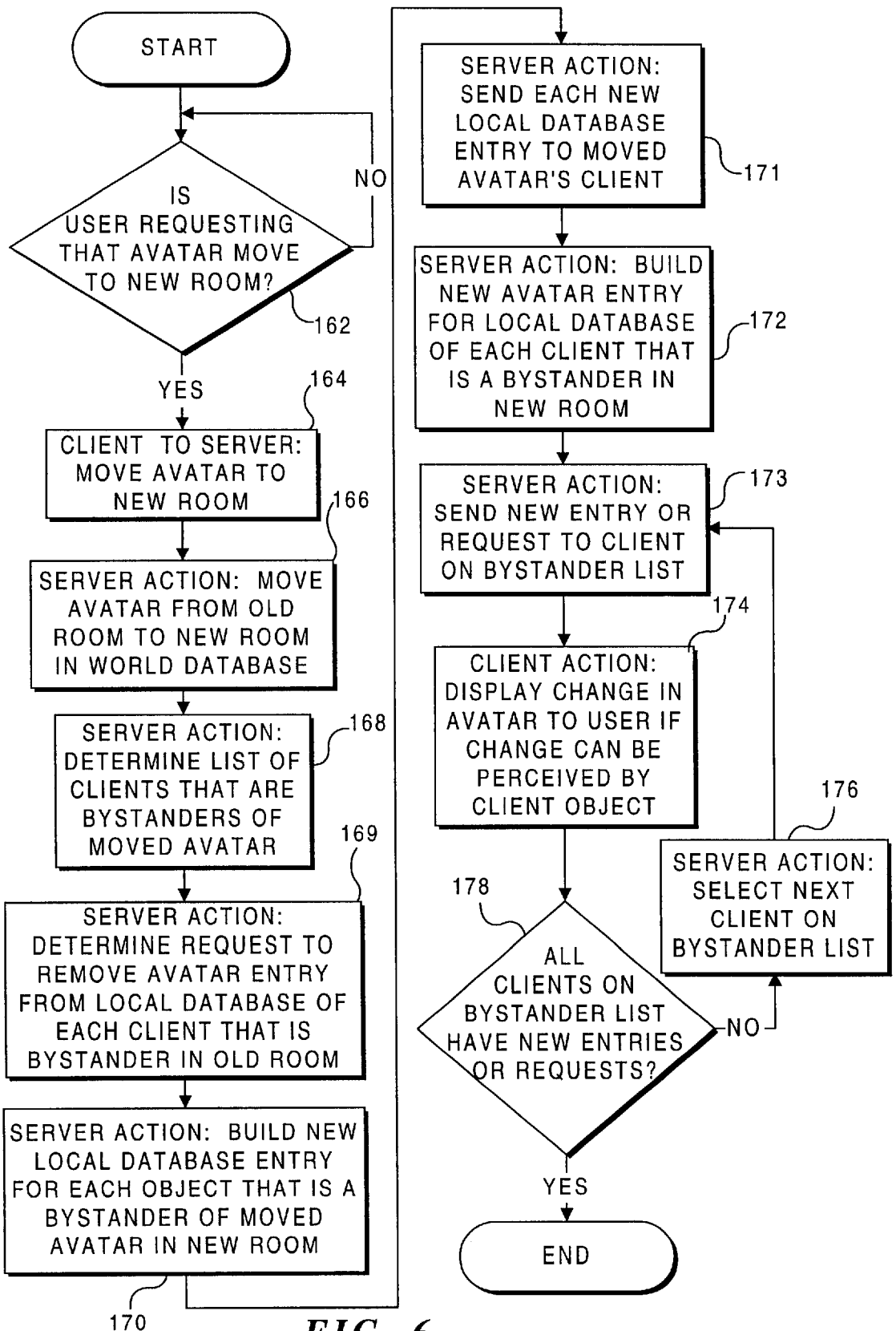
FIGS. 6, 7, and 8 are flow charts showing the steps for selectively updating a client's local database when an avatar moves from one room to another room.

In FIG. 6, a flow chart illustrating the logic implemented to move an object from one room to another room is shown. In this example, the moving object is an avatar that is associated with a client (user). However, substantially the same steps may be applied to move another type of object from one room to another room. From a start block, the logic advances to a block 162 and waits for an instruction by the user to move an avatar to a new room, to be detected. Upon detection of the instruction, the logic advances to a block 164 in which the client sends a request to the server to move the avatar from one room to another room. After making the request, the logic flows to a block 166, where the server responds to the request to move the avatar to the new room by updating the virtual world database to reflect the change in the location of the avatar. Once the world database has been updated, the logic steps to a block 168 in which the server determines a list of clients that are bystanders of the moving avatar. The logic flows to a block 169 and the server makes a request of those clients on the bystander list that are not bystanders in the new room for the moved avatar. The request instructs these clients to remove the entries for the moving avatar from their local databases. The logic steps to a block 170 and the server builds new local database entries for each object that is a bystander of the moved avatar in the new room. After the entries are built, the logic moves to a block 171, and the server sends new local database entries to the client of the moved avatar for each object that is a bystander of the moved avatar in the new room.

Next, the logic advances to a block 172 in which the server builds new entries for the local databases of every client on the list of bystanders that are bystanders in the new room for the moved avatar. Once the new entries are added, the logic flows to a block 173, and the server sends either a new entry to a local database of a client on the list that is a bystander in the new room, or else a request to a client on the list that is a bystander in the old room. After sending the new entry or request, the logic advances to a block 174, which indicates that the client will display the change in the location of the moved avatar to the user if the moving avatar is within a perception region extent of another object associated with the client, such as another avatar. Next, the logic moves to a decision block 178 to determine if all of the clients on the list of bystanders have received a new entry or request. If not, the logic proceeds to a block 176 in which the server selects the next client on the list of bystanders, and the logic loops back to implement the steps of blocks 172, 174, and 178 again. The looping through these steps continues until the test at decision block 178 is affirmative; then, the logic advances to an end block. Upon reaching the end block, all of the clients on the list that are bystanders of the avatar in the new room will have received new entries in their local databases to indicate the change in the location of the moved avatar. Also, all of the other clients on the list that were bystanders of the avatar in the old room, will have received requests to remove the avatar entry from their local databases.

Figure 7:
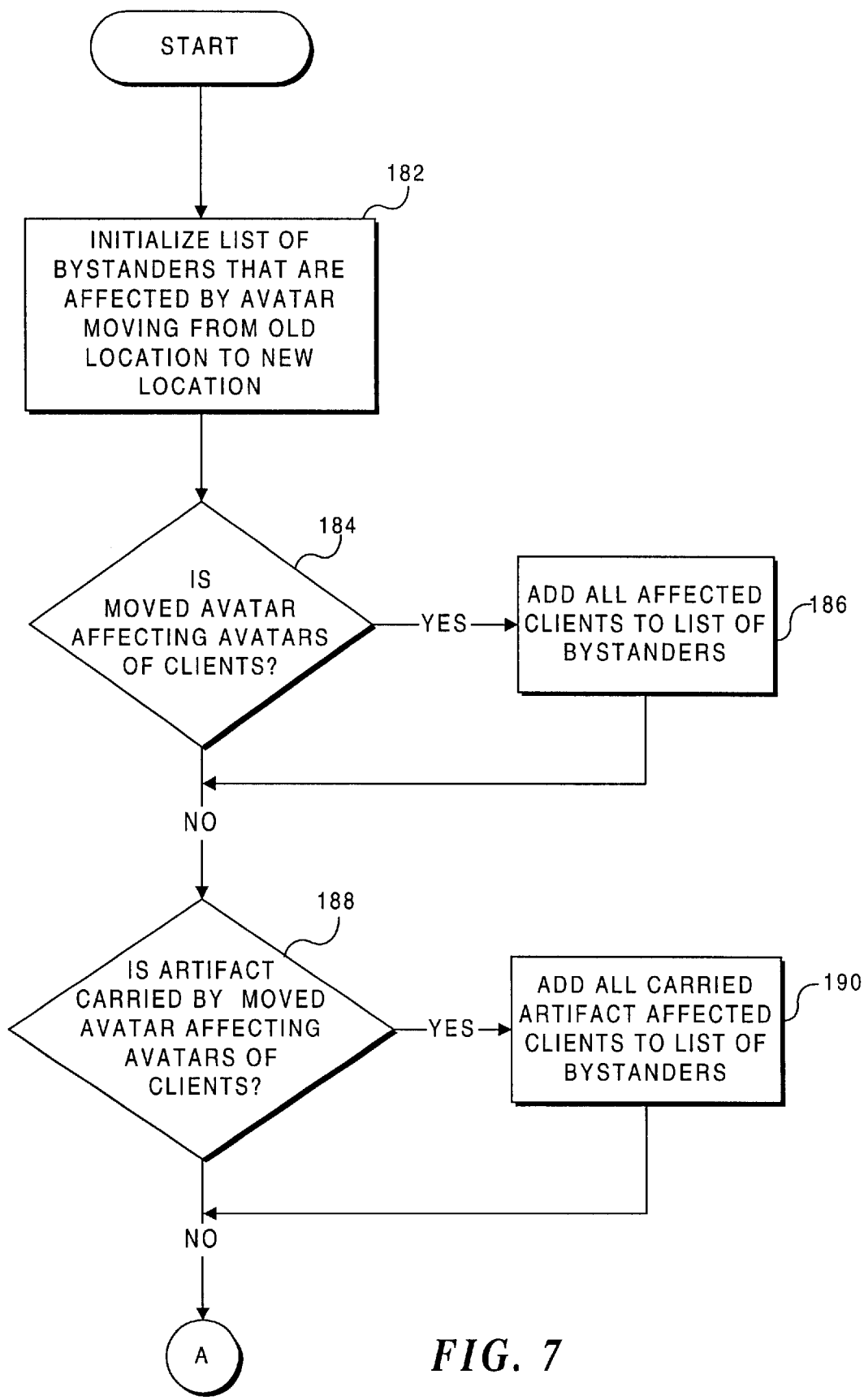
Figure 8:
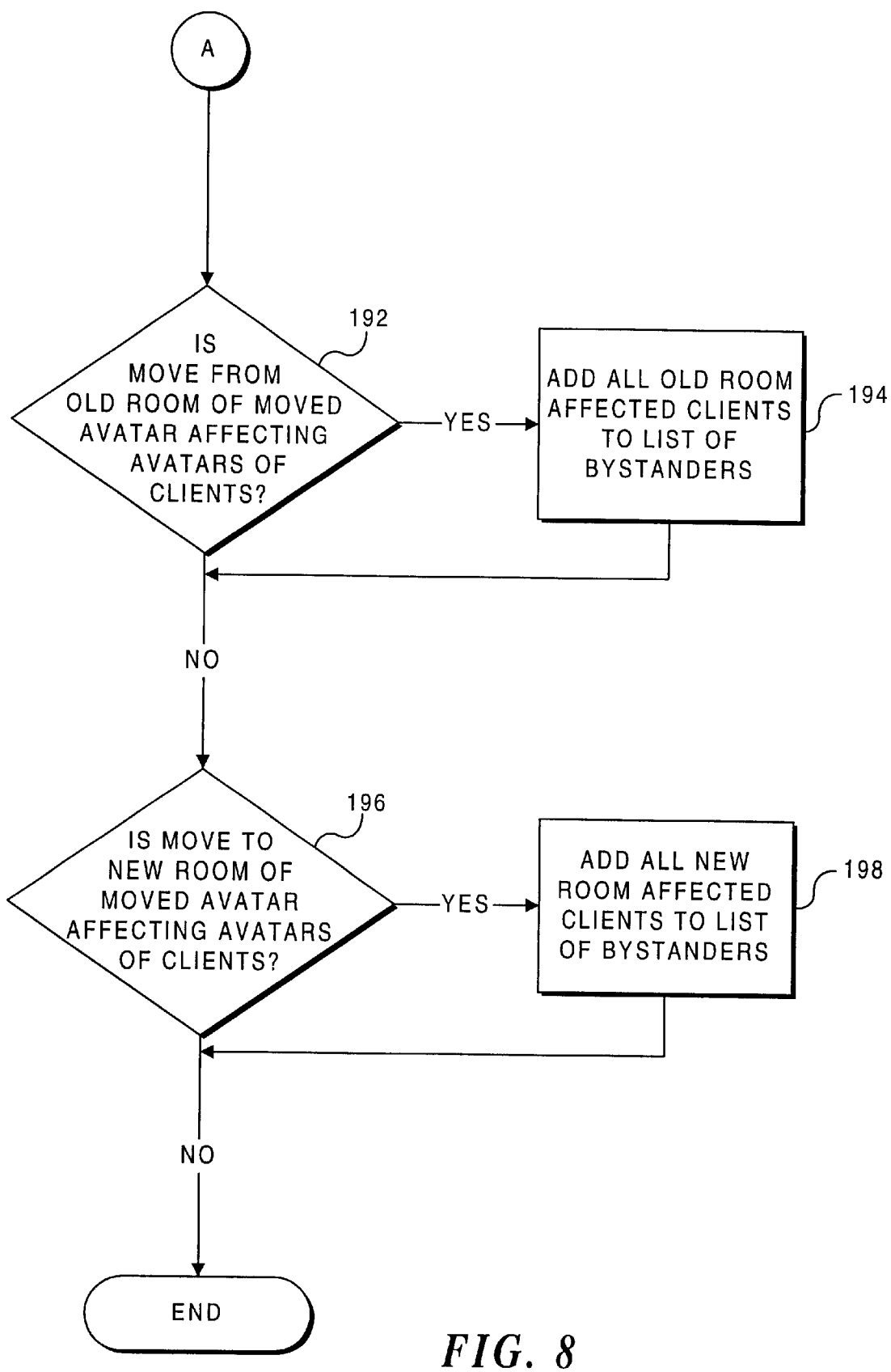

A more detailed description of the steps involved in determining the bystanders in block 168 of FIG. 6 is provided by the flow chart shown in FIGS. 7 and 8. From a start block, the logic advances to a block 182, initializing a list of clients that are potentially or actually affected by an avatar moving from one room to another room. After this initialization, the logic advances to a decision block 184 to determine if the moving avatar may affect the avatars of other clients, i.e., whether the moving avatar has entered into, or alternatively, out of the perception regions associated with the other clients' avatars. If so, the logic steps to a block 186, and all potentially or actually affected clients are added to the list of bystanders. If not or if the logic flow has otherwise advanced to block 186, the logic proceeds to a decision block 188 to determine if an artifact carried by the moving avatar may affect any other client avatars. If so, the logic flows to a block 190, which provides that all clients potentially or actually affected by the artifact carried by the moving avatar are added to the list of bystanders. All artifacts wielded by the moving avatar are considered to be carried, and the determination at block 188 is performed accordingly.

If the result of decision block 188 is negative or if the logic has previously advanced to block 190, the logic advances to a decision block 192, which is shown in FIG. 8. In decision block 192, the logic determines whether the move by the avatar from the room previously occupied affects any other client avatars disposed in that room, i.e., prior to the move, determines whether the moving avatar was disposed in the bystander region of the other client avatars in the old room. If so, the logic proceeds to a block 194 in which all clients that are potentially or actually affected by the avatar moving from the previously occupied room to the new room are added to the list of bystanders. These clients are also designated as bystanders in the old room for the moving avatar. A negative determination in block 192 or the completion of block 194 leads to a decision block 196, to determine if the move by the avatar to another room affects any other avatars disposed in the new room, i.e., to determine if the moving avatar is disposed in the bystander region of the other client avatars in the new room. If affirmative, the logic steps to a block 198 so that all clients for avatars in the new room that are potentially or actually affected by the move to the new room are added to the list of bystanders. Further, these clients are designated as bystanders in the new room for the moving avatar. However, if the determination is negative or if block 196 has been completed, the logic continues to an end block and returns to the main logic flow shown in FIG. 6.

The preferred embodiment of the claimed invention is a graphically rendered 3D VWE that includes various artifacts and avatars that may be associated with clients/users. The artifacts and avatars are disposed within an interconnected set of rooms. Further, objects such as avatars and/or artifacts may move through the portals connecting rooms, so that the entire length and breadth of the VWE may be explored by the clients associated with the objects. Also, the VWE may include some rooms having interactive games, puzzles, and/or informational resources that may be perceived by the users of avatars that are visiting those rooms. Furthermore, updates for a change in the VWE are only provided to those clients of a user that have an avatar disposed inside the bystander region associated with the change.

Another embodiment of the present invention entails graphically rendering a series of 3D chat rooms that are linked by portals in which participants of the chat session are represented by avatars. Each avatar is graphically rendered using a set of properties that are stored within the local database of at least one client or user represented by the avatar. The typical premise of a chat room is that a user represented by an avatar in the chat room can communicate with the other users represented by other avatars disposed within the same chat room. Local database updates are only provided to those clients having avatars positioned within the bystander region of a change in the VWE. Accordingly, the present invention is used as discussed above to handle a large number of users involved in a VWE chat session, but employs substantially less data transmission over the network and requires substantially less computational resources to respond to changes in the VWE than are required by the prior art techniques.

Another contemplated embodiment of the present invention employs a client to produce a display that selectively depicts a plurality of perception regions to a user. The perception regions do not necessarily correspond to the boundaries of perception and/or bystander regions for an object that is associated with the client employed by the user to produce the display. Instead, the user can selectively employ perception regions that are associated with other objects for portraying variously sized regions of the VWE. These perception regions can be selected to display various activities and/or locations within the VWE.

Although the present invention has been described in connection with the preferred form of practicing it and modifications thereto, those of ordinary skill in the art will understand that many other modifications can be made to the embodiments of the invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for updating a virtual world environment (VWE) that is displayed to a plurality of users to include a change in the VWE, comprising the steps of:
    (a) displaying at least part of the VWE to each user with a client computer that manages a local database defining at least a portion of the VWE, said local database containing an entry for each object that is disposed within said portion of the VWE;
    (b) in response to a change in a selected object occurring within the VWE, transmitting the change to a server computer;
    (c) updating the world database with the server computer to include the change in the selected object;
    (d) determining an affected object in a bystander region of the selected object, said affected object being at least potentially capable of perceiving the change to said selected object;
    (e) transmitting the change to each client computer associated with the affected object, said client computer having an entry in its local database for the affected object; and
    (f) entering the change to the selected object in the local database managed by the client computer of each user associated with the affected object.

2. The method of claim 1, further comprising the step of displaying a plurality of objects contained within the local database managed by the client computer to the user.

3. The method of claim 1, wherein entries in the local database and in the world database specify a plurality of properties and a basic type for the objects disposed within the VWE.

4. The method of claim 3, wherein the basic type comprises one of: an avatar, an artifact, a portal, and a room.

5. The method of claim 3, wherein the plurality of properties for the objects disposed within the VWE comprise at least one of: a name, a geometry, an owner, a location, and a content list.

6. The method of claim 1, wherein the client computer is located remote from the server computer, so that the server computer transmits information to and receives information from the client computer over a communication link.

7. The method of claim 1, wherein the change is sensed by said affected object when said change occurs within a perception region that is associated with said affected object.

8. The method of claim 7, further comprising the step of displaying each object contained within said perception region with the client computer that is associated with said affected object.

9. The method of claim 7, wherein the perception region is associated with a particular type of data, said perception region being affected by the disposition of the affected object within the VWE.

10. The method of claim 1, further comprising the steps of:
    (a) associating a particular location within the VWE with a static perception region defined by an extent; and
    (b) displaying the portion of the VWE contained within the extent of the static perception region to the user.

11. The method of claim 1, further comprising the steps of:
    (a) associating a dynamic perception region of a portion of the VWE, as defined by a selected extent, with an object; and
    (b) displaying any portion of the VWE coming within the selected extent of the dynamic perception region to the user, as said object with which the dynamic perception region is associated moves about in the VWE.

12. The method of claim 1, wherein the change to the selected object is caused by at least one of the plurality of users.

13. The method of claim 1, wherein the change to the selected object is caused by a simulation.

14. A system for displaying a virtual world environment (VWE) to a plurality of users, each user having a client computer and being associated with an object disposed within the VWE, comprising:
    (a) a server/client network that includes a server computer linked in data communication with the client computer of each user, the server computer comprising:
        (i) a memory for storing machine instructions and a world database that defines the VWE; and
        (ii) a processor coupled to the server communication device and the memory, said processor executing the machine instructions stored in the memory, said machine instructions causing the processor to implement functions that include:
            (A) managing the world database to include any change to a selected object disposed within the VWE;
            (B) determining an affected object in a bystander region of the selected object, said affected object being at least potentially capable of perceiving the change to said selected object; and
            (C) transmitting the change to each client computer associated with the affected object as a transmitted change; and
    (b) each client computer comprising:
        (i) a display on which at least a part of the VWE is presented to the user having the client computer;
        (ii) a memory for storing machine instructions that control the client computer, and for storing a local database that defines at least a portion of the VWE; and
        (iii) a processor coupled to the display, and the memory, said processor executing the machine instructions stored in the memory, said machine instructions causing the processor to implement functions that include:
            (A) managing the local database that defines said portion of the VWE, said local database containing entries for each object that is disposed within said portion of the VWE, said processor updating the local database to include any transmitted change to the selected object that is received from the server computer;

(B) displaying said portion of the VWE with the display;

(C) in response to a local change in a local selected object occurring within said portion of the VWE, transmitting the local change to the server computer; and (D) entering the local change to the local selected object in the local database managed by the client computer when the client computer is associated with the affected object.

15. A computer readable medium having computer executable instructions for updating a portion of a virtual world environment (VWE) that is maintained by a client computer, each of a plurality of users having a client computer on which a part of the VWE is displayed, said computer executable instructions, when executed by a server computer, causing the server computer to carry out a plurality of functions, including:

(a) managing a world database defining the VWE, said world database containing entries for objects that are disposed within the VWE;

(b) receiving a change to a selected object from the client computer of one of the plurality of users;

(c) updating the world database for the VWE to include the change to the selected object; and (d) transmitting the change to the selected object only to each client computer associated with an object that is potentially affected by the change to the selected object, said server computer thereby enabling a local database maintained by said client computer to be updated to include the change to the selected object.

16. A computer readable medium having computer executable instructions for updating and displaying a virtual world environment (VWE) on a client computer, said computer executable instructions, when executed by the client computer, causing the client computer to carry out a plurality of functions, including:

(a) managing a local database defining a portion of the VWE, said local database containing entries for objects that are disposed within the portion of the VWE;

(b) receiving a change to a selected object from a server computer that is coupled in communication with a plurality of users, each of which have a client computer that is executing the machine instructions, said server computer managing a world database that includes entries for the objects in the VWE, said change to the selected object being received only by client computers that are displaying an object at least potentially affected by the change to the selected object;

(c) updating the local database for the VWE to include the change to the selected object; and (d) transmitting any local change to a local selected object to the server computer, said client computer thereby enabling the world database maintained by said server computer to be updated to include the change to the selected object and to transmit the local change to only those client computers that include objects displayed, which are potentially affected by the local change.

17. A method for updating a virtual world environment (VWE) for a plurality of users to include a change in the VWE, comprising the steps of:

(a) associating objects disposed within the VWE with a user, at least one object associated with the user being chosen for display to the user with a client computer that manages a local database defining at least a portion of the VWE, said local database containing an entry for each object that is disposed within a bystander region of the displayed object associated with the user in which at least one properly of an object in the bystander region is potentially evident to the displayed object;

(b) in response to a change in a selected object in the VWE, transmitting the change from a client computer to a server computer that manages a world database containing entries for the objects disposed within the VWE;

(c) updating the world database with the server computer to include the change in the selected object;

(d) determining an affected object disposed in the bystander region of the selected object, the affected object being at least potentially capable of perceiving the change to the selected object;

(e) employing the server computer to convey the change to each client computer that is associated with the affected object and has an entry in its local database for the affected object;

(f) entering the change to the selected object in the local database managed by each client computer associated with the affected object; and (g) displaying the change to the selected object using each client computer associated with the affected object if the change is sensed by said affected object and if said affected object is also being displayed to the user of said client computer, so that said change is only displayed for users viewing affected objects that actually perceive the change to the selected object.

18. The method of claim 17, further comprising the step of displaying a plurality of objects contained within the local database managed by the client computer to the user.

19. The method of claim 18, wherein the step of displaying includes the step of representing said at least the portion of the VWE contained within the local database with at least one of graphics, video, text, and sound.

20. The method of claim 17, wherein each entry in the local database and in the world database specifies a plurality of properties and a basic type for the associated object disposed within the VWE.

21. The method of claim 20, wherein the basic type for each object disposed within the VWE comprises one of: an avatar, an artifact, a portal, and a room.

22. The method of claim 20, wherein the plurality of properties for each object disposed within the VWE comprises at least one of: a name, a geometry, an owner, a location, and a content list.

23. The method of claim 22, wherein each object disposed within the VWE includes a content list property and is identified as one of an open container and a closed container.

24. The method of claim 23, wherein an object included in the content list is not perceived by other objects disposed within the bystander region of the object unless said object is identified as an open container.

25. The method of claim 17, wherein the client computer is located remote from the server computer, so that the server computer transmits information to and receives information from the client computer over a communication link.

26. The method of claim 25, wherein the communication link includes one of an Internet and an intranet network.

27. The method of claim 17, wherein the server computer comprises a plurality of server computers linked together in communication, a number of server computers that comprise said plurality of server computers varying dynamically as required to administer the world database.

28. The method of claim 17, wherein the change is perceived by said affected object when said change occurs within a perception region that is associated with said affected object.

29. The method of claim 28, further comprising the step of displaying each object contained within said perception region with each client computer that is associated with said affected object.

30. The method of claim 28, wherein the perception region is associated with a particular type of data, said perception region being affected by the disposition of the affected object within the VWE.

31. The method of claim 30, wherein the particular type of data with which the perception region is associated is one of: graphic data, image data, video data, text data, audio data, and force feedback data.

32. The method of claim 31, wherein if the perception region is associated with audio data and if a source of the audio data is disposed within said perception region of the affected object, the client computer that is associated with the affected object produces the audio data for the user.

33. The method of claim 31, wherein if the perception region is associated with force feedback data and if a virtual source of force feedback is disposed within said perception region of the affected object, the client computer that is associated with the affected object produces the force feedback data for the user.

34. The method of claim 17, further comprising the steps of:
   (a) associating a particular location within the VWE with a static perception region defined by an extent; and
   (b) displaying the portion of the VWE contained within the extent of the perception region to the user.

35. The method of claim 17, further comprising the steps of:
   (a) associating a dynamic perception region of a portion of the VWE, as defined by a selected extent, with an object; and
   (b) displaying any portion of the VWE coming within the selected extent of the dynamic perception region to the user, as said object moves about in the VWE.

36. The method of claim 17, wherein the change to the selected object is caused by at least one of the plurality of users.

37. The method of claim 17, wherein the change to the selected object is caused by a simulation.

38. A system for displaying a virtual world environment (VWE) for a plurality of users, each user having a client computer and being associated with objects disposed within the VWE, comprising:
   (a) a server/client network that includes a server computer coupled in communication with the client computer of each user, the server computer comprising:
      (i) a memory for storing machine instructions and a world database that defines the VWE; and
      (ii) a processor coupled to the memory, said processor executing the machine instructions stored in the memory and exchanging information with each client communication device, said machine instructions causing the processor to implement functions that include:
         (A) managing the world database, said world database containing entries for the objects disposed within the VWE;
         (B) updating the world database with each change to a selected object disposed within the VWE;
         (C) determining an affected object disposed in a bystander region of the selected object, said affected object being at least potentially capable of perceiving the change to said selected object; and
         (D) conveying the change to each client computer associated with the affected object; and
   (b) each client computer comprising:
      (i) a display on which a VWE may be presented to the user having the client computer;
      (ii) a memory for storing machine instructions that control the client computer, and for storing a local database that defines at least a portion of the VWE; and
      (iii) a processor coupled to the display and the memory, said processor executing the machine instructions stored in the memory and exchanging information with the server computer, said machine instructions causing the processor of the client computer to implement functions that include:
         (A) managing the local database and updating the local database to include the change received from the server computer, said local database defining said at least the portion of the VWE, said local database containing entries for objects that are disposed within a bystander region of an object associated with the user and displayed to the user, each object in the bystander region having at least one property that is potentially evident to the displayed object associated with the user;
         (B) enabling the user to select an object within the bystander region of the displayed object and change a property of the selected object, producing a local change;
         (C) entering the local change to the selected object in the local database managed by the client computer;
         (D) transmitting the local change in the property of the selected object to the server computer, to enable the server computer to update the local databases of each client computer associated with the affected object, said associated client computer having an entry in its local database for said affected object; and
         (E) displaying the local change to the selected object using each client computer associated with the affected object when the local change is both sensed by said affected object and said affected object is being displayed for the user of said client computer, so that said change is only displayed for users viewing objects that actually perceive the local change to the selected object.

39. A computer readable medium having computer executable instructions for updating a virtual world environment (VWE) that is displayed to a plurality of users to include a change in the VWE, said computer executable instructions defining a plurality of functions, including:
   (a) associating objects disposed within the VWE with a user, at least one object associated with the user being chosen for display to the user with a client computer that manages a local database defining at least a portion of the VWE, said local database containing an entry for each object that is disposed within a bystander region of the displayed object associated with the user in which at least one property of an object in the bystander region is potentially evident to the displayed object;

(b) in response to a change in a selected object, transmitting the change to a server computer that manages a world database containing at least one entry for every object disposed within the VWE;

(c) updating the world database with the server computer to include the change in the selected object;

(d) determining an affected object disposed in the bystander region of the selected object, the affected object being at least potentially capable of perceiving the change to the selected object;

(e) employing the server computer to convey the change to each client computer that is associated with the affected object, said client computer having an entry in its local database for the affected object;

(f) entering the change to the selected object in the local database managed by each client computer associated with the affected object; and (g) displaying the change to the selected object using the client computer associated with the affected object when the change is both sensed by said affected object and said affected object is also being displayed to the user of said client computer, so that said change is only displayed for users viewing objects that actually perceive the change to the selected object.

* * * * *